US008560509B2

(12) United States Patent
Xia et al.

(10) Patent No.: US 8,560,509 B2
(45) Date of Patent: Oct. 15, 2013

(54) INCREMENTAL COMPUTING FOR WEB SEARCH

(75) Inventors: Zenglin Xia, Beijing (CN); Ningyi Xu, Beijing (CN); Lintao Zhang, Beijing (CN); Bojun Huang, Beijing (CN); Mao Yang, Beijing (CN); Lang Zong, Beijing (CN); Feng-Hsiung Hsu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 50 days.

(21) Appl. No.: 13/178,495

(22) Filed: Jul. 8, 2011

(65) Prior Publication Data

US 2013/0013587 A1 Jan. 10, 2013

(51) Int. Cl.
*G06F 17/30* (2006.01)
(52) U.S. Cl.
USPC ........... 707/696; 707/706; 707/711; 707/771; 707/774
(58) Field of Classification Search
USPC .......................... 707/696, 706, 711, 771, 774
See application file for complete search history.

(56) References Cited

U.S. PATENT DOCUMENTS

| | | | | |
|---|---|---|---|---|
| 7,093,012 B2 * | 8/2006 | Olstad et al. | ................... | 709/224 |
| 7,174,346 B1 * | 2/2007 | Gharachorloo et al. | .............. | 1/1 |
| 7,254,580 B1 * | 8/2007 | Gharachorloo et al. | .............. | 1/1 |
| 7,302,425 B1 | 11/2007 | Bernstein et al. | | |
| 7,428,530 B2 * | 9/2008 | Ramarathnam et al. | .............. | 1/1 |
| 7,467,131 B1 * | 12/2008 | Gharachorloo et al. | .............. | 1/1 |
| 7,693,824 B1 * | 4/2010 | Diament | ................ | 707/999.003 |
| 7,797,295 B2 * | 9/2010 | Bell et al. | ....................... | 707/705 |
| 7,797,298 B2 * | 9/2010 | Sareen et al. | .................. | 707/706 |
| 7,840,557 B1 | 11/2010 | Smith et al. | | |
| 2004/0249799 A1 | 12/2004 | Demarcken et al. | | |
| 2005/0108203 A1 * | 5/2005 | Tang et al. | ......................... | 707/3 |
| 2008/0098041 A1 * | 4/2008 | Chidambaran et al. | ........ | 707/201 |
| 2011/0173177 A1 * | 7/2011 | Junqueira et al. | ............. | 707/709 |

OTHER PUBLICATIONS

Blanco, et al. "Caching Search Engine Results over Incremental Indices", Retrieved at <<http://www.hugo-zaragoza.net/academic/pdf/blanco_SIGIR2010b.pdf>>, Proceeding of the 33rd international ACM SIGIR conference on Research and development in information retrieval, Jul. 19-23, 2010.
Cambazoglu, et al. "A Refreshing Perspective of Search Engine Caching", Retrieved at <<http://hpc.isti.cnr.it/ ~rossano/ReadingDaySlides/SemCec.pdf>>, Proceedings of the 19th international conference on World wide web, May 28, 2010.
Zhu, et al., "Class-based Cache Management for Dynamic Web Content", Retrieved at <<http://ieeexplore.ieee.org/stamp/stamp.jsp?arnumber=00916615>>, Twentieth Annual Joint Conference of the IEEE Computer and Communications Societies, vol. 3, 2001.
Ozcan, et al., "Cost-Aware Strategies for Query Result Caching in Web Search Engines", Retrieved at <<http://www.cs.bilkent.edu.tr/~oulusoy/acm_tweb.pdf>>, Proceedings of the 31th European Conference on IR Research on Advances in Information Retrieval, Aug. 2010.

\* cited by examiner

*Primary Examiner* — Debbie Le

(57) ABSTRACT

Architecture that performs incremental computing for web searches by employing methods at least for storing the results of repeat queries on unchanged webpages and for computing results for the repeated queries. The architecture includes one or more algorithms for pre-computing query results on index servers, for only selectively choosing index servers whose result for a query change for a query computation process, and for re-using the unchanged web pages stored in the cache and computing results upon changed index and unchanged index separately.

20 Claims, 13 Drawing Sheets

|  | CHANGED DOCUMENTS | UNCHANGED DOCUMENTS |
|---|---|---|
| NEW QUERY | COMPUTE | COMPUTE |
| REPEATED QUERY | COMPUTE | COMPUTE → CACHE |

*FIG. 3*

INCREMENTAL COMPUTING FOR WEB SEARCH

BACKGROUND

Commercial search engines oftentimes have over a hundred billion documents indexed, which can then map to petabytes of data. Search engines rely upon systems comprising large numbers of machines grouped in clusters by functionality, such as index servers, documents servers, and caches.

In a web search engine, the query results in the cache expire after an index update. A common solution for this problem is to re-compute every query after the index update. However, this is a waste of time since most of the webpages do not change and some percentage of queries is repeated. Current search engines also suffer from the heavy daily index merge, where the whole index will be updated.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture performs incremental computing for web searches by employing methods at least for storing the results of repeat queries on unchanged documents (e.g., webpages) in a frontend cache and then computing results for the repeat queries from the frontend cache.

Where the results cannot be obtained from the frontend cache, incremental computing can be accelerated at the index servers according to one or more techniques. Each index server has two types of index: a delta index and a total index. The delta index includes the changed documents (e.g., new, deleted, etc.), and the total index includes all documents including the changed documents. Thus, when processing a new query that is not in the frontend cache, processing does not involve computing the results separately on two index parts, and then merging the results, which is excessively complicated.

Accordingly, the architecture includes one or more algorithms for pre-computing query results on the index servers, for only selectively choosing index servers whose result for a query change for a query computation process, and for re-using the unchanged web pages stored in the cache and computing results upon changed index and total index separately.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 3 illustrates a diagram that indicates document processing in the frontend cache.

DETAILED DESCRIPTION

Figure 1:
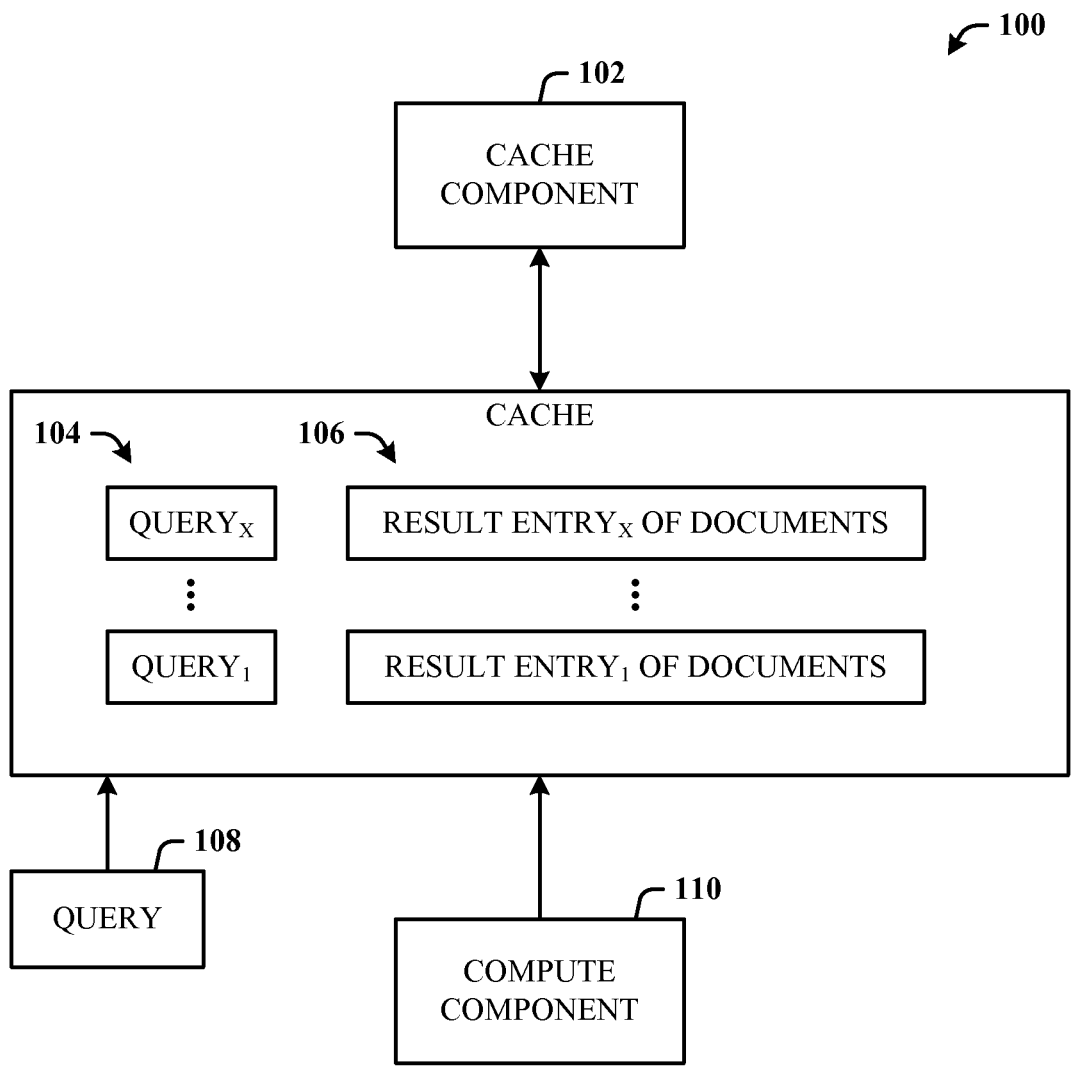
FIG. 1 illustrates a search system in accordance with the disclosed architecture.

Cache components appear in different parts of an engine and in different forms, for example, result, posting list, and document caches. The disclosed architecture focuses on result caches, which store previously computed query results. These caches may be deployed in separate machines, acting as a proxy, or co-exist in the same machine with query processors. At a high level, a search engine receives a query from a user, processes the query over its indexed documents, and returns a small set of relevant results to the user. If a previously computed set of results is cached, the query can be served directly from the cache, eliminating the need to process the query.

Search engines attempt to keep at least some portions of their index relatively up-to-date, with latency measured in hours, for example. Modern search engines all strive to surface documents in search results within minutes of acquiring those documents (e.g., by crawling or ingesting feeds). This is realized by modifying a live index (most, by append operations) rather than replacing the index with the next generation. Such engines are referred to as having incremental indices.

An underlying assumption of caching applications is that the same request, when repeated, will result in the same response that was previously computed. Hence, this may not hold in incremental indexing situations, where the searchable corpus is constantly being updated, and thus, the results of any query can potentially change at any time and the cache expires for every index update. In such cases, the engine decides whether to re-compute repeated queries thereby reducing the effectiveness of caching their results, or to save computational resources at the risk of returning stale cached entries.

Existing search engines apply simple solutions to this dilemma, ranging from performing no caching of search results at all to applying time-to-live (TTL) policies on cached entries so as to ensure worst-case bounds on staleness of the results. Studies indicate that most webpages do not change for every update of the indices, and a small percentage of the unique queries from the frontend are repeated. If there is no caching of search results, the effectiveness of the search engine will be reduced.

A solution to this problem is to selectively invalidate the cached results only of those queries whose results are actually affected by the updates to the underlying index. However, since only a small percentage of webpages change for every update, most of the re-compute work will return the unchanged results.

The disclosed architecture addresses search results caching and computing over incremental indices (incremental computing) to selectively re-compute the changed webpages for the recurring queries (e.g., the same query that is received repeatedly). Thus, the unchanged webpages stored in the cache entries will continue to be served.

Incremental computing for the web search engines contains an offline part and an online part. As the offline part, the structure of the index is designed so that an index merger can generate changed and total indices. By way of this merger, index servers can prepare server information about local processes such as which webpages have been changed or deleted and which webpages are newly crawled. The server information is also used by the online part to selectively choose index servers based on changed webpages, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a search system 100 in accordance with the disclosed architecture. The system 100 includes a cache component 102 that manages cache-based queries 104 and associated result entries 106 of documents against which a query 108 is processed, and a compute component 110 that updates changed documents of the result entries 106. The cache component 102 selectively updates the changed documents of a cached recurring query based on a policy. The cache component 102 requests re-compute of the query in one or more index servers based on server information. The cache component 102 receives updated server information from one or more index servers that perform a pre-compute operation on the changed documents.

Figure 2:
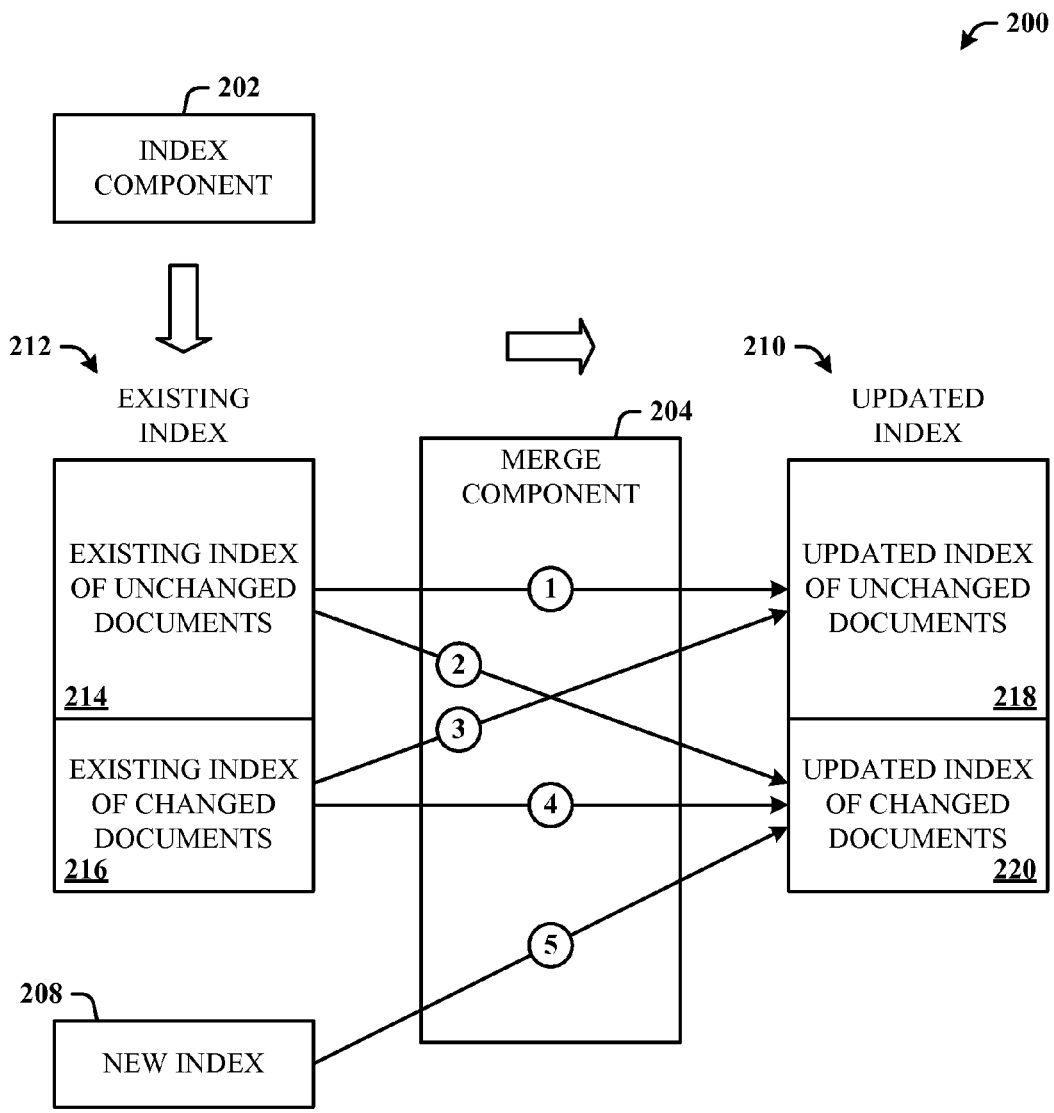
FIG. 2 illustrates a system of index merger that generates changed and total indices.

FIG. 2 illustrates a system 200 of index merger that generates changed and total indices. An index component 202 is provided that generates an overall incremental index having two separate indices: an index of unchanged documents and an index of all documents. A merge component 204 facilitates the merge of an existing index 206 and a new index 208 into an updated index 210. The updated index 210 is the entire (total) index of changed and unchanged documents. Thus, this index 210 can be processed separately without processing the index of changed documents. The structure of the incremental index is designed so that index merger can generate changed and total indices.

More specifically, an existing index 212 includes an existing index of unchanged documents 214 and an existing index of changed documents 216. The new index 208 has been created and needs to be merged with the existing index 212 to create the updated index 210. The updated index 210 includes an updated index of unchanged documents 218 and an updated index of changed documents 220.

As depicted by the arrowing, at ①, there can be unchanged documents in the existing index 212 that are indexed as unchanged after the merge into the updated index of unchanged documents 218. At ②, there can be unchanged documents in the existing index 212 that change and become part of the updated index of changed documents 218. At ③, there can be changed documents in the existing index 212 that do not change and thus, become part of the updated index of unchanged documents 220. At ④, there can be changed documents in the existing index 212 that change and thus, become part of the updated index of changed documents 220. At ⑤, the new index 208 is merged into the updated index of changed documents 220.

In other words, the index component 202 generates the incremental existing index 212 of documents against which the query is processed. The existing index 212 of documents includes the index of existing unchanged documents 214 and an index of existing changed documents 216. The merge component 204 merges the existing index 212 and the new index 208 to generate the updated index 210, which comprises the index of unchanged documents 218 and the updated index of changed documents 220.

As described hereinbelow, index servers create server information related to documents that have changed or been deleted and which documents are newly crawled. By way of the merger, the index servers can prepare server information about which webpages (documents) have been changed or deleted and which webpages are newly crawled. The server information is used by the online part. The index servers each return documents to the cache component 102 (of FIG. 1) that are sorted and combined into a result entry.

FIG. 3 illustrates a diagram 300 that indicates document processing in the frontend cache. The frontend cache includes recurring queries and associated result entries of unchanged documents that will continue to be served when possible. Changed documents in the cache are re-computed at the index servers and the server information enables updating of the changed documents in the frontend cache.

Figure 4:
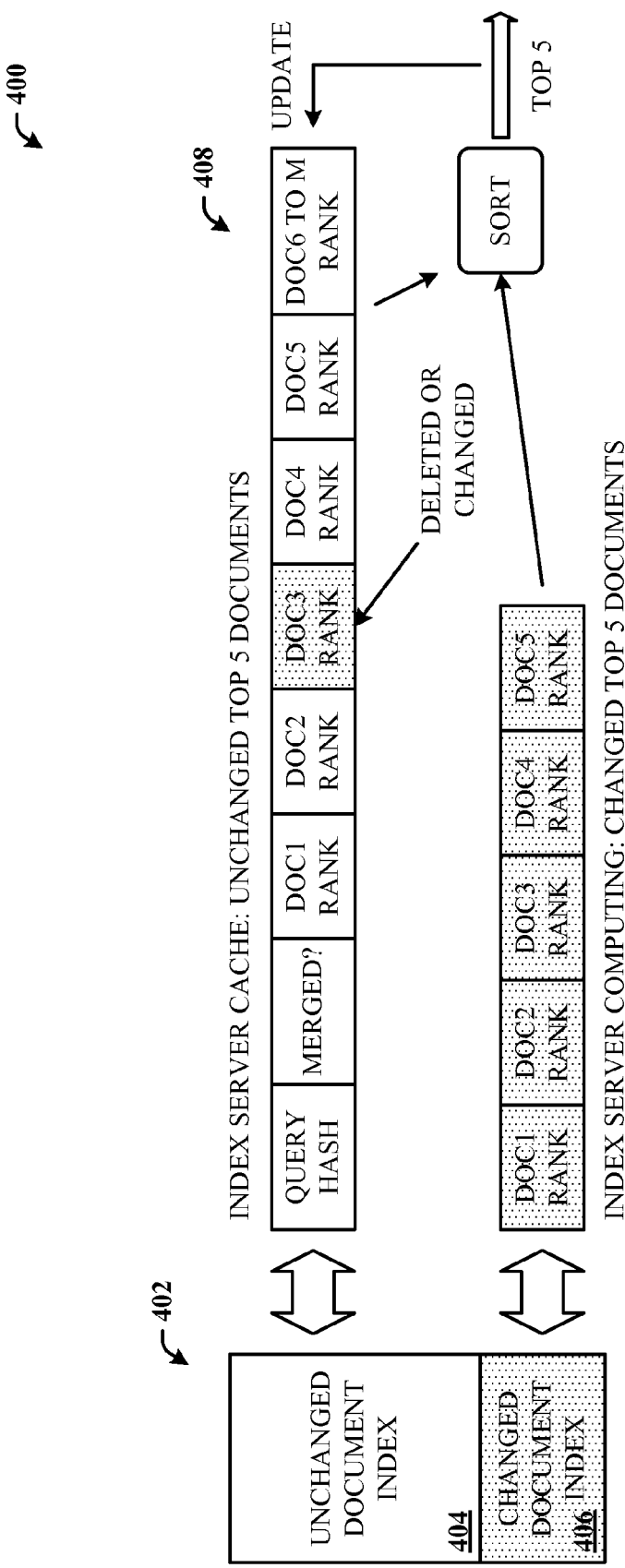
FIG. 4 illustrates a system of query flow and the cache usage in an index server.

FIG. 4 illustrates a system 400 of query flow and the cache usage in and index server. Multiple computing machines grouped in clusters, for example, can serve as the index servers. The system 400 shows an existing index 402 that comprises both an unchanged document index 404 and a changed document index 406. When a user query arrives from the frontend cache of the search engine (the query is not a recurring query having result entries pre-stored in frontend result cache), each index server returns a predetermined number (e.g., five) of sorted webpages (documents). All webpages at the index servers are sorted and combined to an existing result entry for the query. The result entries from one or more of the index server (based on the server information) are returned to the frontend cache. Cache policies of the frontend then determine whether to insert the entry into the frontend cache.

More specifically, at each index server, an incremental computing module (component) includes a local cache 408 that stores recurring queries and associated result entries. In this particular example, the top five documents are obtained, thus, each result entry has 5+N documents ranked in descending order (DOC1 has the highest rank) for the query, where N is a pre-defined number, for example, 5. Since the existing index 402 is split into the unchanged document index 404 and the changed document index 406, the query is computed on both indices (404 and 406).

If the result entry of the query is not in the frontend cache, the index server computes the top five documents on the whole index (402); however, if the result entry of the query is in the frontend cache, the index server computes the top five documents on the changed document index 406, and merges with the result entry in the index server cache 408 to form a new entry with the five top documents. After computing, the frontend cache is updated according to the cache policies. Here, DOC3 has been deleted or changed in the index server cache 408. Thus, the cache result entry needs to be updated from the changed document index 406. Sorting outputs the top five documents to update the frontend cache. The index server cache 408 can store an equal number of documents or more. Thus, the online part of incremental computing contains two different parts: one part is in the index servers and the other part is in frontend system.

Figure 5:
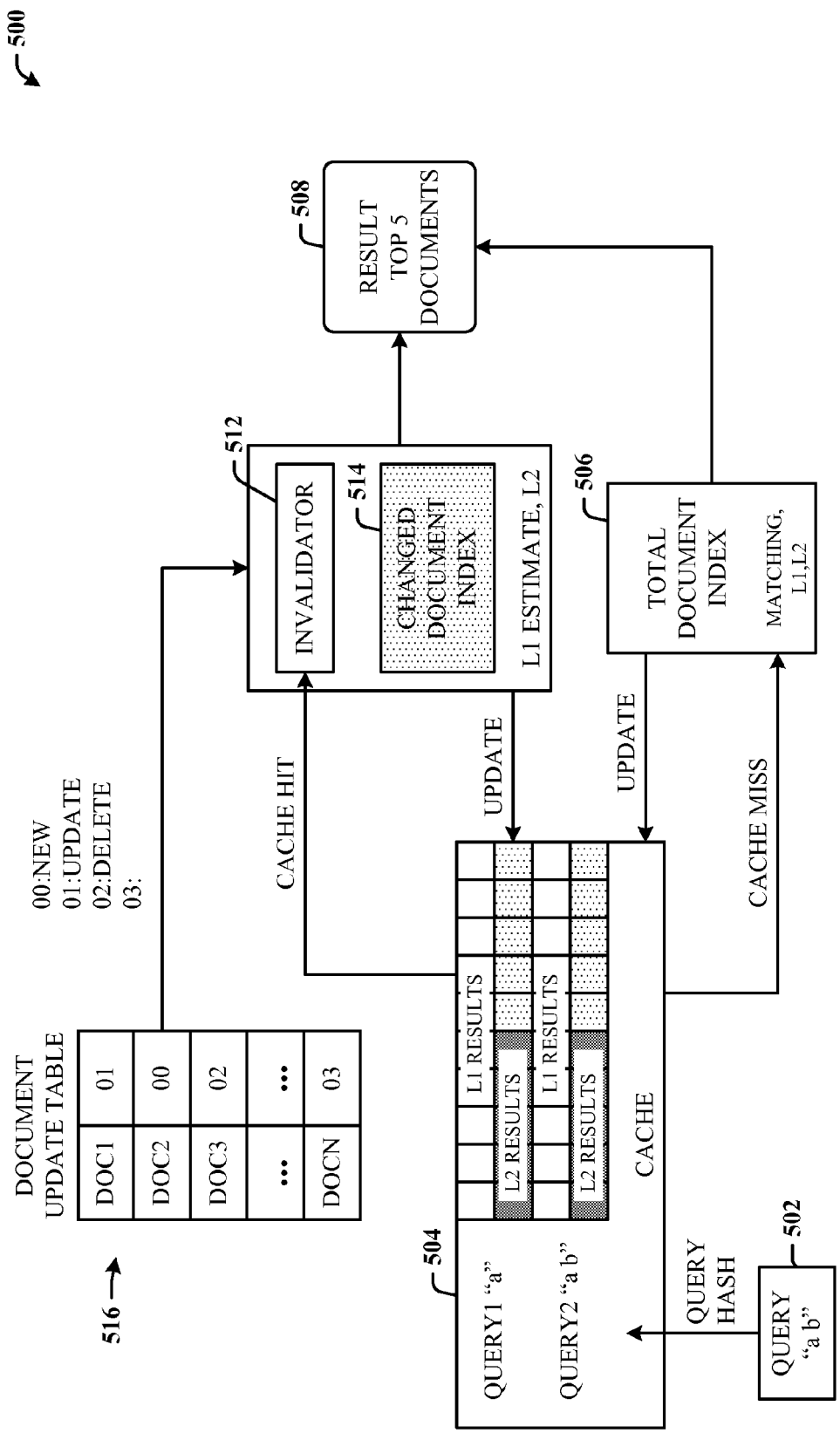
FIG. 5 illustrates a system of cache usage and update.

FIG. 5 illustrates a system 500 of cache usage and update. The query stream is not always smooth. Thus, sometimes the index servers are busy, and sometimes are free. When an index server is free, it will re-compute (also pre-compute, when not required to re-compute) one or more of the queries stored in the index server cache. The queries to be pre-computed are chosen by index server policies, for example, choosing the queries with high frequency of usage. Using the pre-computing capability, the index server prepares one or more result entries for queries which are likely to be repeated. If the result entry is changed after an index update, the result entry is inserted into the index server cache. If the result entry of a query has not changed, the information will be sent to the frontend cache so that the frontend cache ignores this index server when that query is to be re-computed.

In the frontend, the cache stores entire result entries of some recurring queries. By examining the prepared server information from the offline part as well as each index server, the frontend cache "knows" which webpages have changed and which index server will return unchanged results for each query in the frontend cache. The frontend cache server requests the appropriate index servers to compute the repeated query; however, the index servers that will return unchanged results are ignored. The unchanged result items in the result entry for the query in the frontend cache will continue to be served, and the changed result items in the result entry are re-computed by the index servers.

The system 500 illustrates a query 502 ("a b") that is being processed against a frontend cache 504 that includes two result entries associated with two queries (QUERY1 and QUERY2). If there is a cache miss on the frontend cache 504, the query 502 is processed over a total document index 506. The results from the total document index 506 are then used to update the frontend cache result entries (L1 and/or L2) for QUERY2. The results from the total document index 506 are also sent to a sorter 508 to select the top five documents.

On the other hand, if there is a cache hit, such as for QUERY2, the frontend cache 504 checks for updates at the index server. Thus, an invalidator 512 at the index server operates to invalidate documents that are no longer valid in the cache. The updates to the changed document index 514 are then passed back to the frontend cache 504 to update the QUERY2 result entries (L1 and L2). Additionally, the updates are passed to the sorter 508. A document update table 516 includes document information as to which documents in the index server are new, updated, or deleted. The output of the changed document index 514 and the total document index 506 are merged and sorted to select the top five documents.

Figure 6:
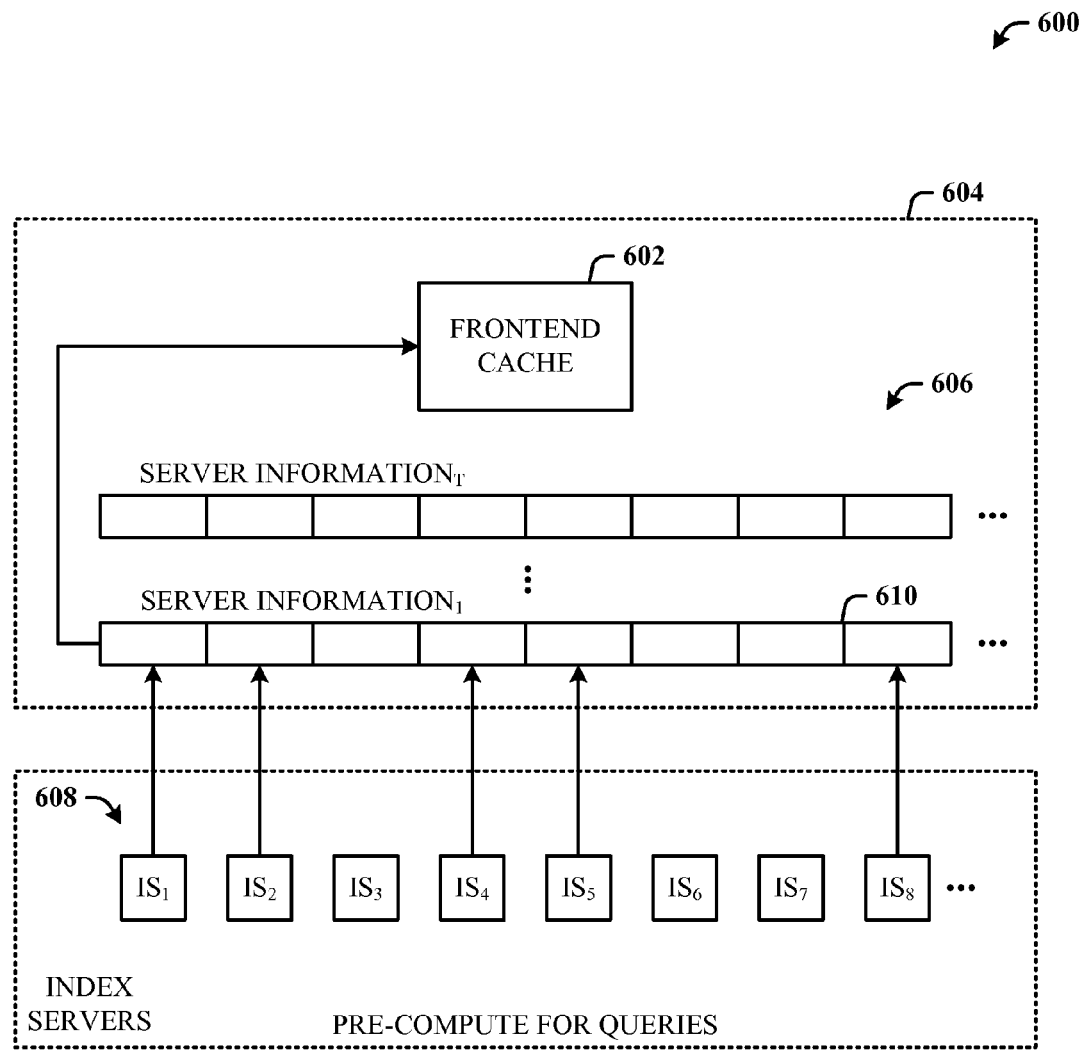
FIG. 6 illustrates a system that changes the server information of a query in a frontend cache.

FIG. 6 illustrates a system 600 that changes the server information of a query in a frontend cache. In the frontend system, the cache stores entire result entries of some recurring queries. By examining the server information and each index server, the cache can determine which webpages have been changed and which index server will return unchanged results for each query in the frontend cache. The cache server requests the index servers compute the repeated query; however, index servers that will return unchanged results, are ignored. The unchanged result in the result entry for the query continues to be served, and the changed result is re-computed by the index servers.

A frontend cache 602 of a frontend system 604 stores index server information 606 (e.g., as arrays) for each query. The server information 606 indicates which webpages in the result entries are returned by which index server, and whether the index server will return different webpages after index update. Here, pre-compute operations occurring on a subset of index servers (IS) 608 (e.g., $IS_1$, $IS_2$, $IS_4$, $IS_5$, and $IS_8$) for a given query updates the associated server information 610 at the frontend system 604. Using pre-computation and invalidation, each index server communicates to the frontend cache 602 that for some of the queries, the index server will return an unchanged result, which modifies the elements in the server information arrays.

Figure 7:
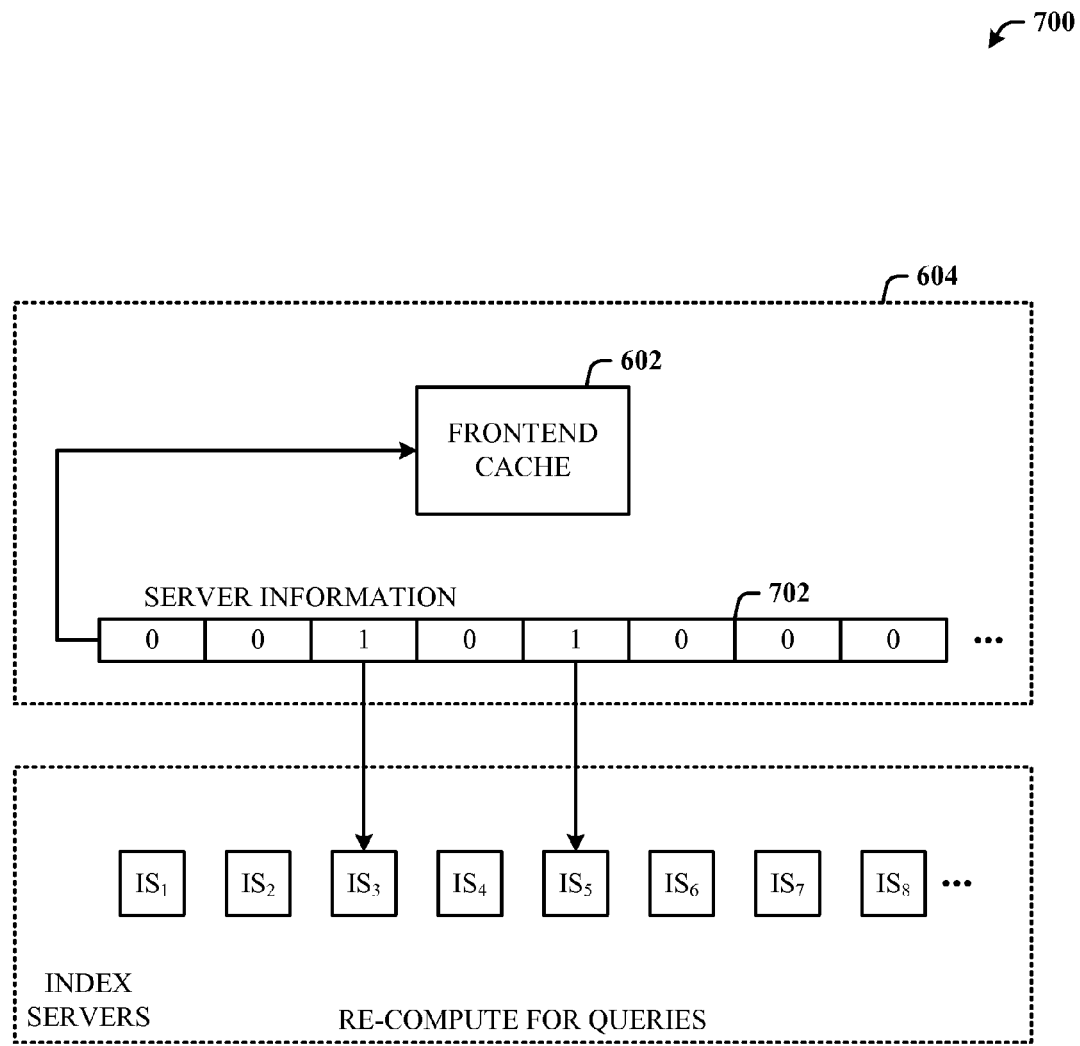
FIG. 7 illustrates a system where the frontend cache chooses one or more index servers to re-compute the query based on results that may be different.

FIG. 7 illustrates a system 700 where the frontend cache chooses one or more index servers to re-compute the query based on results that may be different. Here, server information 702 (e.g., computed offline) indicates that two index servers ($IS_3$ and $IS_5$) are to be accessed for updated query results. The frontend cache 602 requests, based on the server information 702, that the two index servers re-compute the query for possible updated results.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
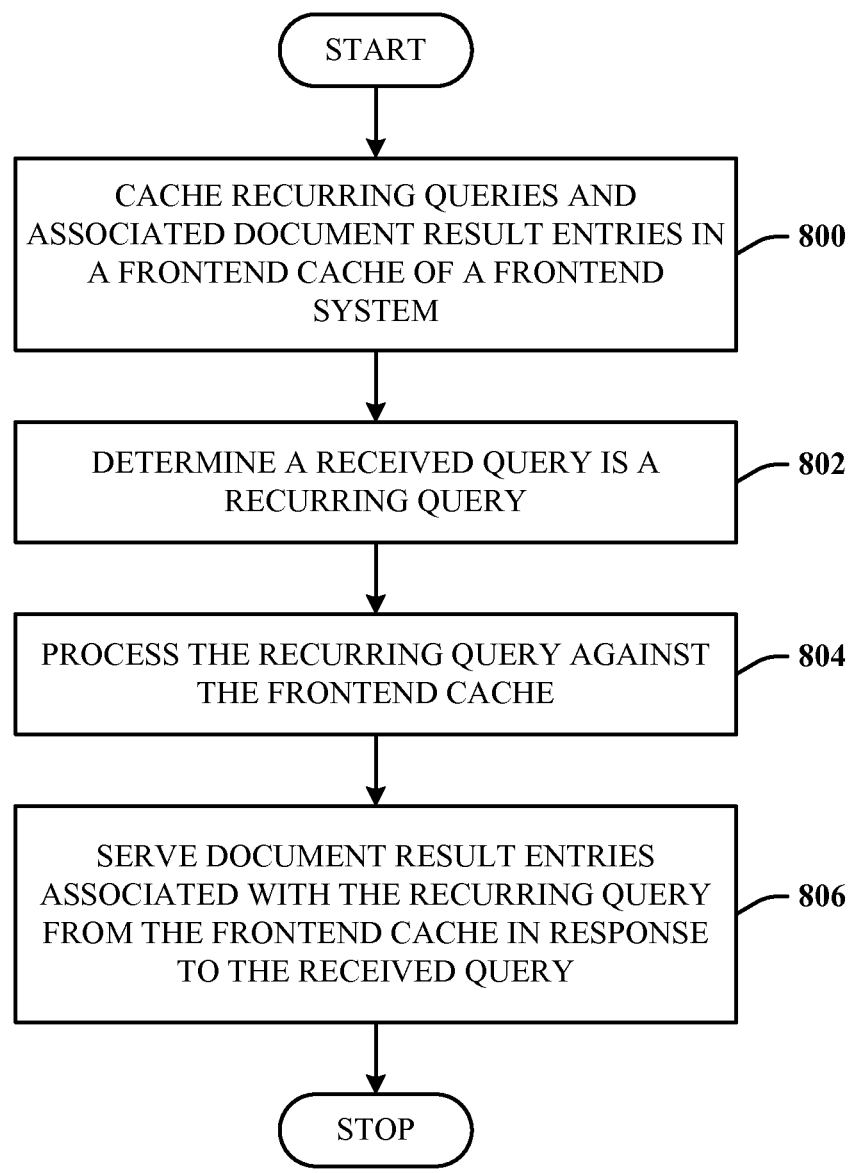
FIG. 8 illustrates a search method in accordance with the disclosed architecture.

FIG. 8 illustrates a search method in accordance with the disclosed architecture. At 800, recurring queries and associated document result entries are cached in a frontend cache of a frontend system. At 802, a received query is determined to be a recurring query. At 804, the recurring query is processed against the frontend cache. At 806, document result entries associated with the recurring query are served from the frontend cache in response to the received query.

Figure 9:
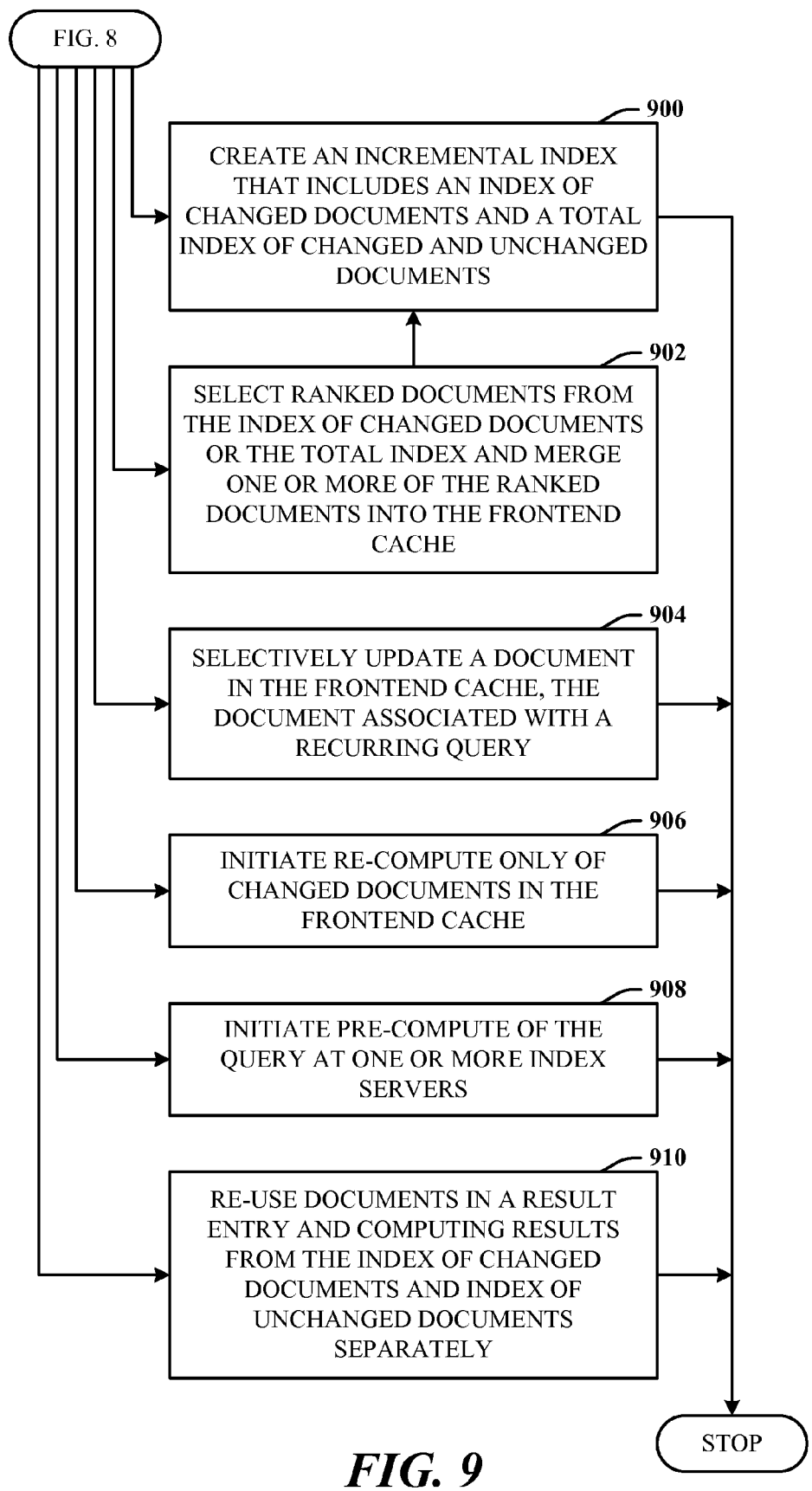
FIG. 9 illustrates further aspects of the method of FIG. 8.

FIG. 9 illustrates further aspects of the method of FIG. 8. Note that the flow indicates that each block can represent a step that can be included, separately or in combination with other blocks, as additional aspects of the method represented by the flow chart of FIG. 8. At 900, an incremental index is created that includes an index of changed documents and a total index of changed and unchanged documents. At 902, ranked documents are selected from the index of changed documents or the total index and one or more of the ranked documents are merged into the frontend cache. At 904, a document in the frontend cache is selectively updated, the document is associated with a recurring query. At 906, re-compute only of changed documents in the frontend cache is initiated. At 908, pre-compute of the query is initiated at one or more index servers. At 910, documents in a result entry are re-used, and results from the index of changed documents and index of unchanged documents are computed separately.

Figure 10:
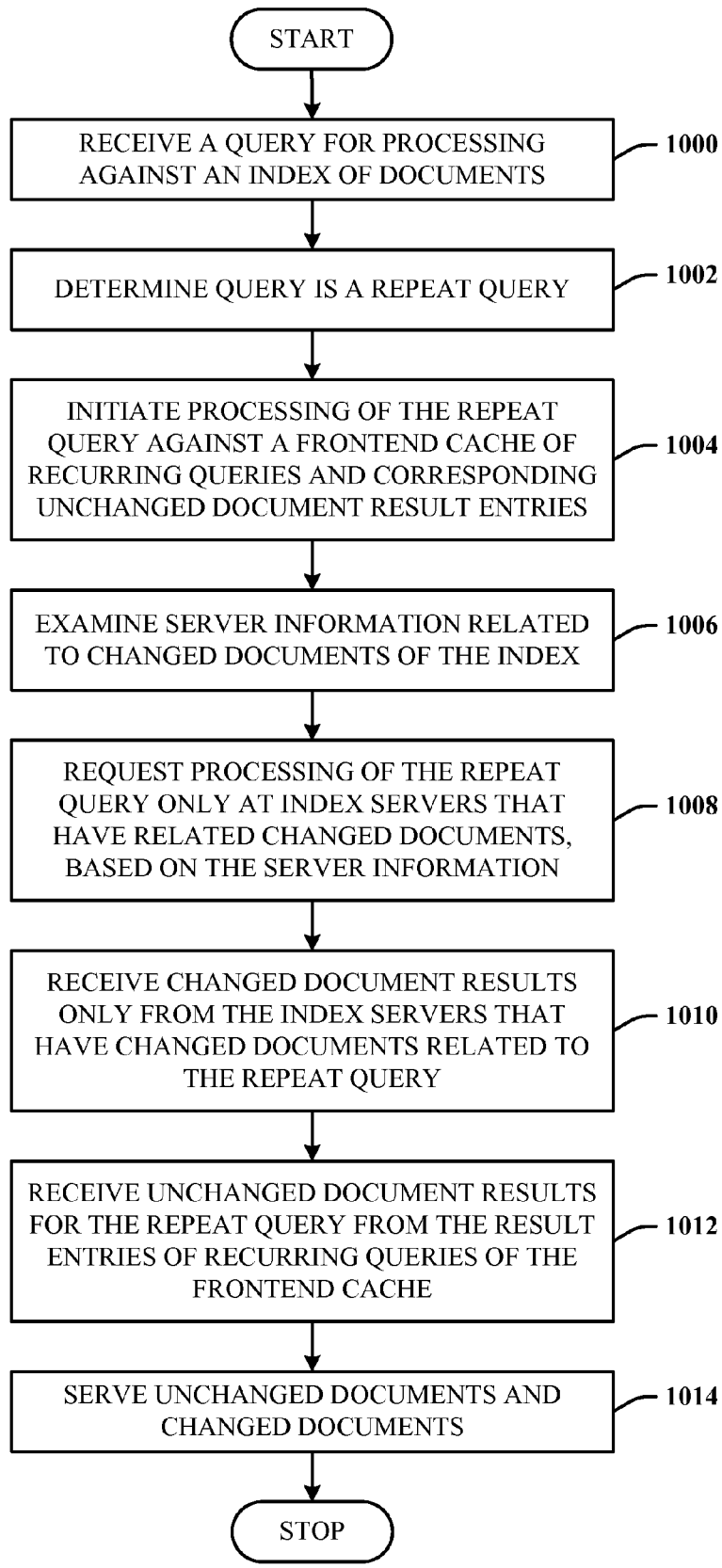
FIG. 10 illustrates an alternative search method.

FIG. 10 illustrates an alternative search method. At 1000, a query is received for processing against an index of documents. At 1002, the query is determined to be a repeat query. At 1004, processing of the repeat query is initiated against a frontend cache of recurring queries and corresponding unchanged document result entries. At 1006, server information related to changed documents of the index is examined. At 1008, processing of the repeat query is requested only at index servers that have related changed documents, based on the server information. At 1010, changed document results are received only from the index servers that have changed documents related to the repeat query. At 1012, unchanged document results for the repeat query are received from the result entries of recurring queries of the frontend cache. At 1014, the unchanged documents and changed documents are served.

Figure 11:
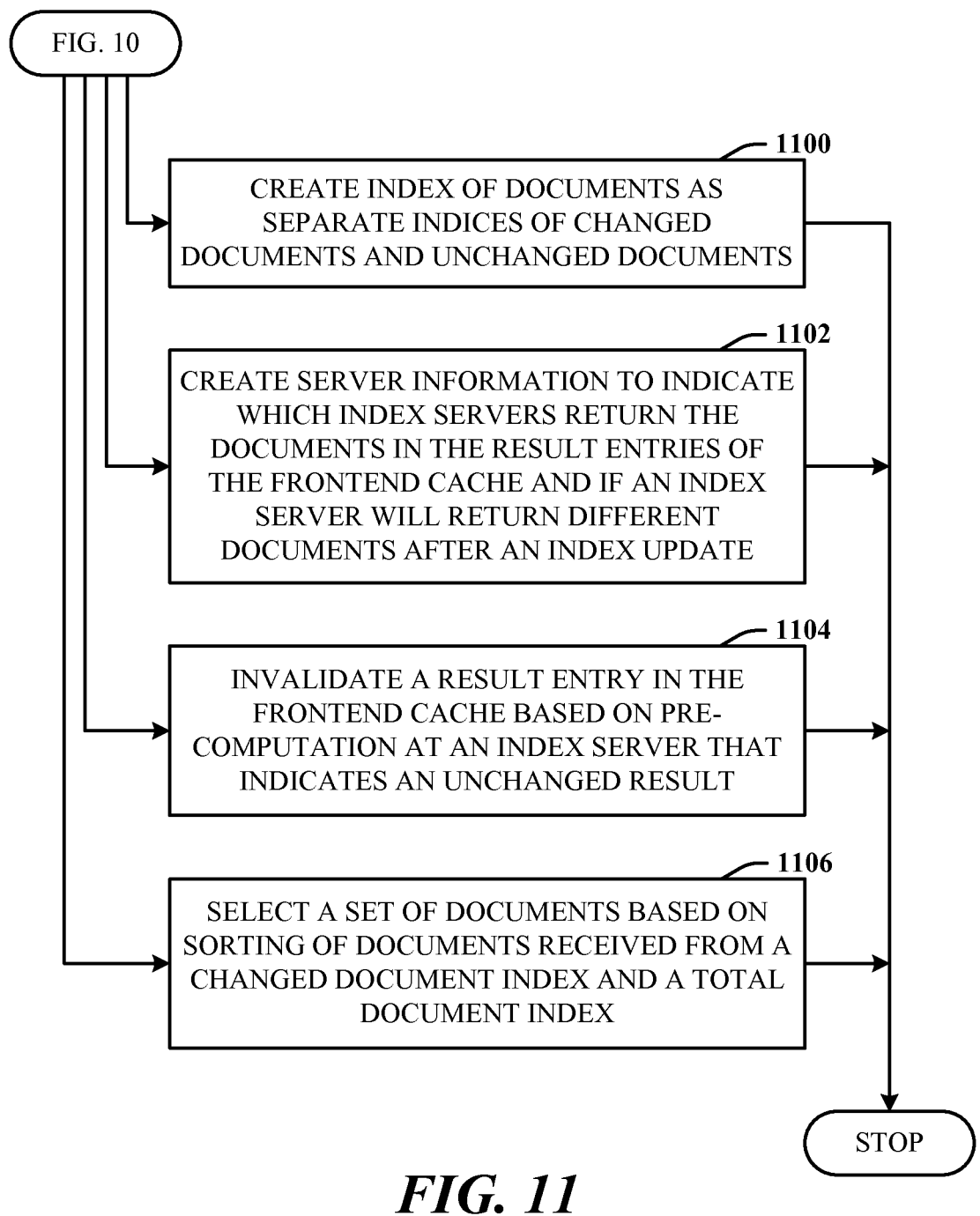
FIG. 11 illustrates further aspects of the method of FIG. 10.

FIG. 11 illustrates further aspects of the method of FIG. 10. Note that the flow indicates that each block can represent a step that can be included, separately or in combination with other blocks, as additional aspects of the method represented by the flow chart of FIG. 10. At 1100, the index of documents is created as separate indices of changed documents and unchanged documents. At 1102, the server information is created to indicate which index servers return the documents in the result entries of the frontend cache and if an index server will return different documents after an index update. At 1104, a result entry in the frontend cache is invalidated based on pre-computation at an index server that indicates an unchanged result. At 1106, a set of documents is selected based on sorting of documents received from a changed document index and a total document index.

Figure 12:
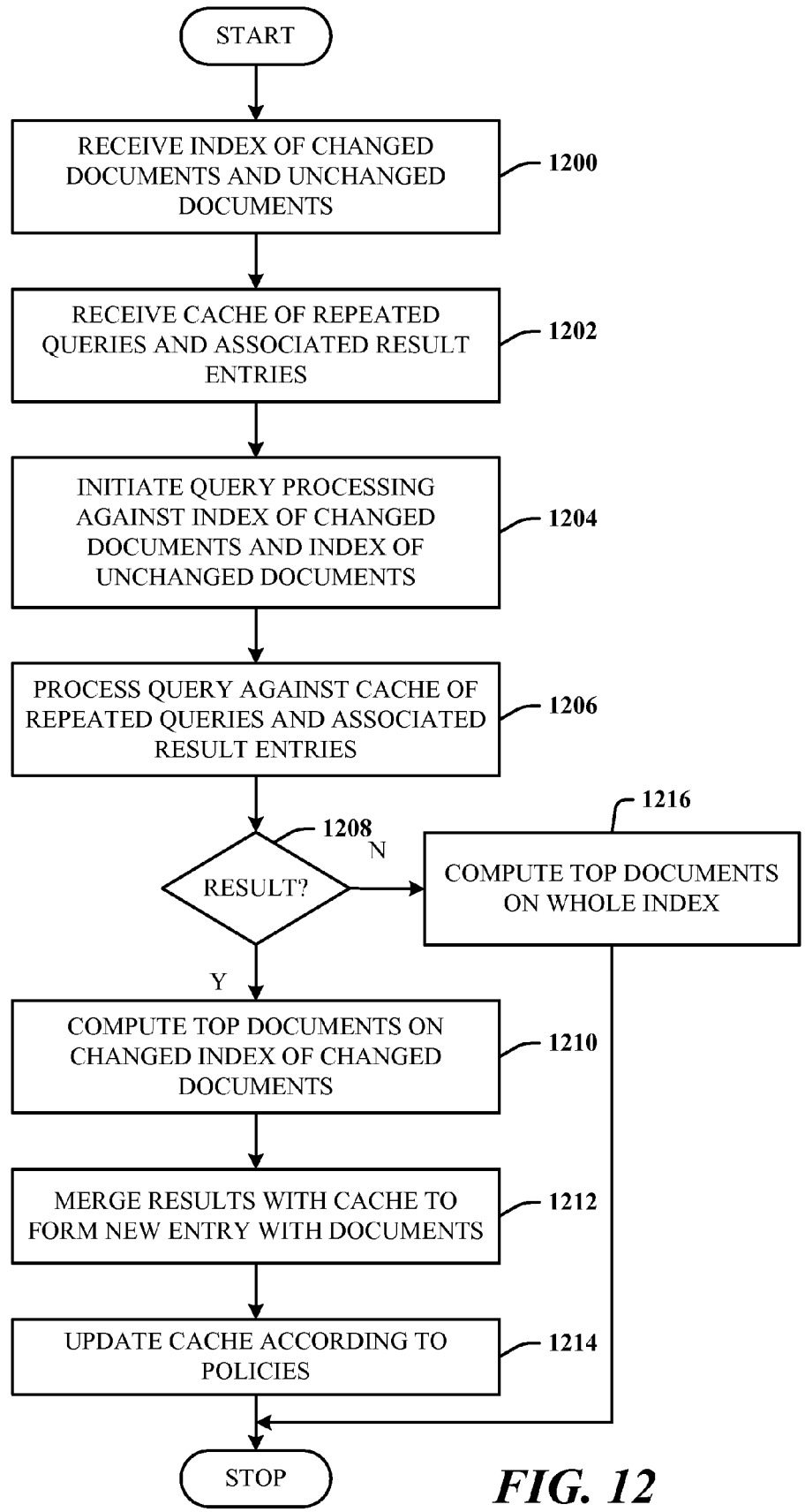
FIG. 12 illustrates an incremental computing method at an index server.

FIG. 12 illustrates an incremental computing method at an index server. At 1200, an index of changed documents and unchanged documents is received. At 1202, a cache of repeated queries and associated result entries is received. At 1204, query processing is initiated against an index of changed documents and an index of changed documents. At 1206, the query is processed against the cache of repeated queries and associated result entries. At 1208, if a result is obtained, flow is to 1210, to compute a set of top documents (e.g., top five) on the changed index of changed documents. At 1212, results are merged with the cache to form a new entry with documents. At 1214, the cache is updated according to cache policies. If no result is obtained at 1208, flow is to 1216 to then compute a set of top documents on the whole index (of changed and unchanged documents).

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 13:
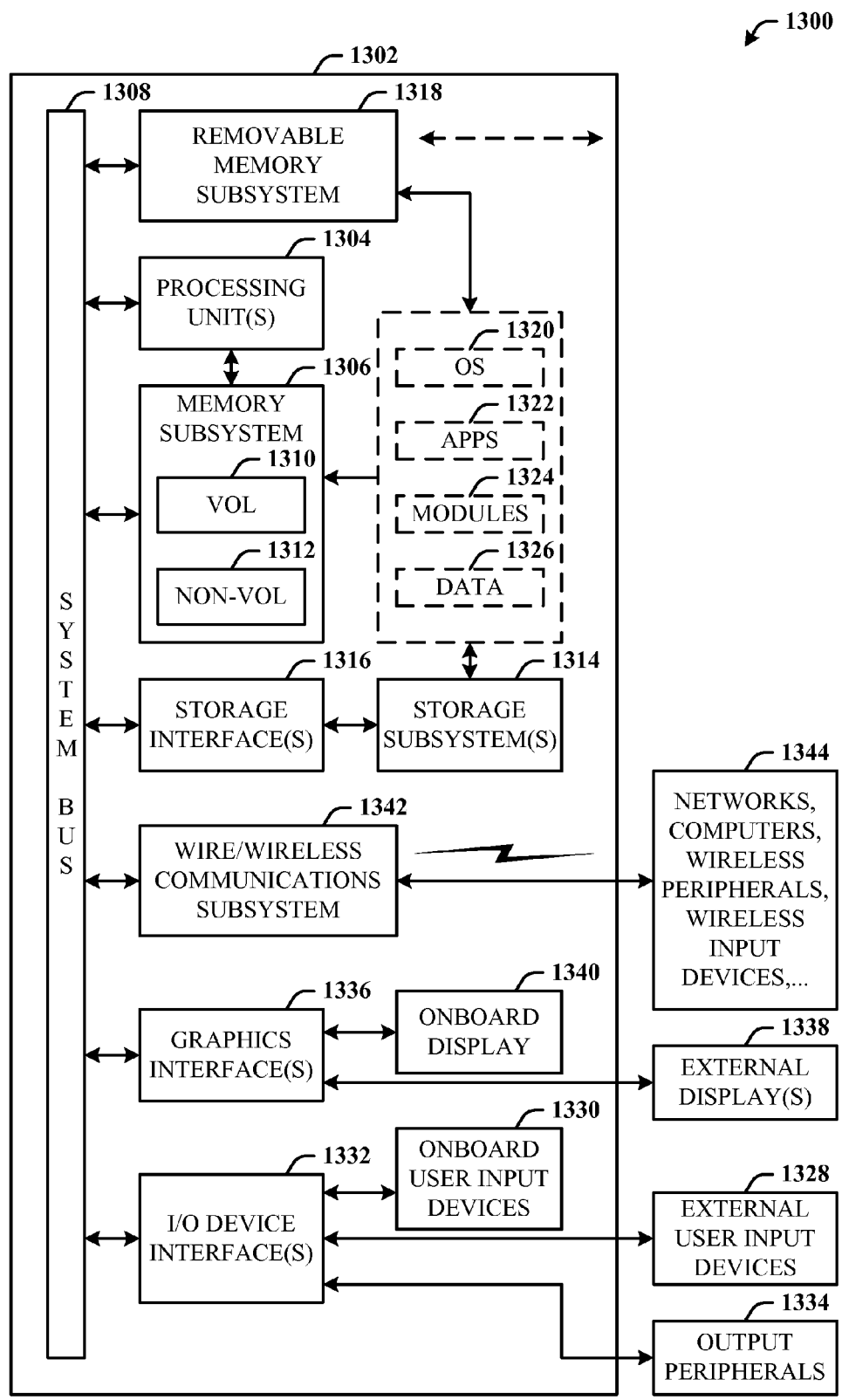
FIG. 13 illustrates a block diagram of a computing system that executes incremental index computing in accordance with the disclosed architecture.

Referring now to FIG. 13, there is illustrated a block diagram of a computing system 1300 that executes incremental index computing in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 13 and the following description are intended to provide a brief, general description of the suitable computing system 1300 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1300 for implementing various aspects includes the computer 1302 having processing unit(s) 1304, a computer-readable storage such as a system memory 1306, and a system bus 1308. The processing unit(s) 1304 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1306 can include computer-readable storage (physical storage media) such as a volatile (VOL) memory 1310 (e.g., random access memory (RAM)) and non-volatile memory (NON-VOL) 1312 (e.g., ROM, EPROM, EEPROM, etc.). A basic input/output system (BIOS) can be stored in the non-volatile memory 1312, and includes the basic routines that facilitate the communication of data and signals between components within the computer 1302, such as during startup. The volatile memory 1310 can also include a high-speed RAM such as static RAM for caching data.

The system bus 1308 provides an interface for system components including, but not limited to, the system memory 1306 to the processing unit(s) 1304. The system bus 1308 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1302 further includes machine readable storage subsystem(s) 1314 and storage interface(s) 1316 for interfacing the storage subsystem(s) 1314 to the system bus 1308 and other desired computer components. The storage subsystem(s) 1314 (physical storage media) can include one or more of a hard disk drive (HDD), a magnetic floppy disk drive (FDD), and/or optical disk storage drive (e.g., a CD-ROM drive DVD drive), for example. The storage interface(s) 1316 can include interface technologies such as EIDE, ATA, SATA, and IEEE 1394, for example.

One or more programs and data can be stored in the memory subsystem 1306, a machine readable and removable memory subsystem 1318 (e.g., flash drive form factor technology), and/or the storage subsystem(s) 1314 (e.g., optical, magnetic, solid state), including an operating system 1320, one or more application programs 1322, other program modules 1324, and program data 1326.

The operating system 1320, one or more application programs 1322, other program modules 1324, and/or program data 1326 can include the entities and components of the system 100 of FIG. 1, the entities and components of the system 200 of FIG. 2, the entities and flow of the diagram 300 of FIG. 3, the entities and components of the systems 400-700 of FIGS. 4-7, and the methods represented by the flowcharts of FIGS. 8-12, for example.

Generally, programs include routines, methods, data structures, other software components, etc., that perform particular tasks or implement particular abstract data types. All or portions of the operating system 1320, applications 1322, modules 1324, and/or data 1326 can also be cached in memory such as the volatile memory 1310, for example. It is to be appreciated that the disclosed architecture can be implemented with various commercially available operating systems or combinations of operating systems (e.g., as virtual machines).

The storage subsystem(s) 1314 and memory subsystems (1306 and 1318) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1302 and includes volatile and non-volatile internal and/or external media that is removable or non-removable. For the computer 1302, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1302, programs, and data using external user input devices 1328 such as a keyboard and a mouse. Other external user input devices 1328 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1302, programs, and data using onboard user input devices 1330 such a touchpad, microphone, keyboard, etc., where the computer 1302 is a portable computer, for example. These and other input devices are connected to the processing unit(s) 1304 through input/output (I/O) device interface(s) 1332 via the system bus 1308, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1332 also facilitate the use of output peripherals 1334 such as printers, audio devices, camera devices, and so on, such as a sound card and/or onboard audio processing capability.

One or more graphics interface(s) 1336 (also commonly referred to as a graphics processing unit (GPU)) provide graphics and video signals between the computer 1302 and external display(s) 1338 (e.g., LCD, plasma) and/or onboard displays 1340 (e.g., for portable computer). The graphics interface(s) 1336 can also be manufactured as part of the computer system board.

The computer 1302 can operate in a networked environment (e.g., IP-based) using logical connections via a wired/wireless communications subsystem 1342 to one or more networks and/or other computers. The other computers can include workstations, servers, routers, personal computers, microprocessor-based entertainment appliances, peer devices or other common network nodes, and typically include many or all of the elements described relative to the computer 1302. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1302 connects to the network via a wired/wireless communication subsystem 1342 (e.g., a network interface adapter, onboard transceiver subsystem, etc.) to communicate with wired/wireless networks, wired/wireless printers, wired/wireless input devices 1344, and so on. The computer 1302 can include a modem or other means for establishing communications over the network. In a networked environment, programs and data relative to the computer 1302 can be stored in the remote memory/storage device, as is associated with a distributed system. It will be appreciated that the network connections shown are exemplary and other means of establishing a communications link between the computers can be used.

The computer 1302 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   computer-executable instructions configured to:
   receive a first instance of a query at a first time, obtain a query result of the query, the query result including multiple result entries of documents, wherein the multiple result entries are obtained from multiple index servers, cache the query result, receive a second instance of the query at a second time that is subsequent to the first time, after the second instance of the query is received, update the query result with an individual updated result entry obtained from an individual index server without updating at least one other result entry of the query result that was obtained from a different individual index server prior to the second time; and a processor configured to execute the computer-executable instructions, wherein the individual updated result entry used to update the query result identifies one or more changed documents that were identified as being changed after the first time.

2. The system of claim 1, wherein the at least one other result entry does not identify any documents that were identified as being changed after the first time.

3. The system of claim 1, wherein the computer-executable instructions are configured to:

request recomputation of the query in at least some of the multiple index servers based on server information received from the multiple index servers.

4. The system of claim 1, wherein the computer-executable instructions are configured to:

respond to the second instance of the query based on the individual updated result entry obtained from the individual index server and the at least one other result entry that was obtained from the different individual index server.

5. The system of claim 1, wherein the computer-executable instructions are further configured to:

generate an existing index of documents against which the second instance of the query is processed, the existing index of documents including an index of existing unchanged documents and an index of existing changed documents.

6. The system of claim 5, wherein the computer-executable instructions are further configured to:

merge the existing index and a new index to generate an updated index that comprises the index of existing unchanged documents and an updated index of changed documents.

7. The system of claim 1, further comprising the index servers, wherein the index servers are configured to create server information related to updated documents, deleted documents, and newly-crawled documents.

8. The system of claim 7, wherein the computer-executable instructions are further configured to:

receive the server information from the index servers; and identify the one or more changed documents from the updated documents, the newly-crawled documents, or both.

9. A method implemented by at least one computer processor, the method comprising:

caching a recurring query and associated document result entries in a cache;

determining that a received query is the recurring query;

maintaining an incremental index that includes a changed document index and an unchanged document index, the changed document index identifying changed documents that have changed since a previous time and the unchanged document index identifying unchanged documents that have not changed since the previous time;

when processing the received query, computing the received query on the changed document index without computing the received query on the unchanged document index, wherein an updated document result entry identifying an individual changed document is obtained from the changed document index; and serving at least some of the associated document result entries from the cache and the updated document result entry in response to the received query.

10. The method of claim 9, further comprising creating the incremental index.

11. The method of claim 10, further comprising selecting ranked documents from the changed document index and merging one or more of the ranked documents into the cache.

12. The method of claim 9, wherein the received query is in the cache when the received query is computed on the changed document index without computing the received query on the unchanged document index.

13. The method of claim 9, further comprising:

determining that another received query is also the recurring query;

determining that the another received query is not in the cache; and computing the another received query on both the changed document index and the unchanged document index.

14. The method of claim 9, further comprising:

computing a top N documents for the received query on the changed document index; and merging the top N documents with an individual document result entry in the cache.

15. The method of claim 14, further comprising:

determining other top N documents for the received query from:

the top N documents, and other documents from the individual document result entry.

16. One or more physical storage media storing computer-executable instructions that, when executed by a computer, cause the computer to perform acts comprising:

caching a query result associated with a first instance of a recurring query, the query result comprising multiple document result entries;

determining that a second instance of the recurring query is received;

maintaining an incremental index that includes a changed document index of changed documents that have changed since a merge was performed on the incremental index and an unchanged document index of unchanged documents that have not changed since the merge was performed;

when processing the second instance of the recurring query, computing the recurring query on the changed document index without computing the recurring query on the unchanged document index to thereby obtain at least one updated document result entry from the changed document index; and updating the query result using the at least one updated document result entry obtained from the changed document index to obtain an updated query result, wherein the at least one updated result entry identifies one or more of the changed documents that have changed since the merge.

17. The one or more physical storage media storing computer-executable instructions of claim 16, the acts further comprising:
   serving the updated query result in response to the second instance of the recurring query.

18. The one or more physical storage media storing computer-executable instructions of claim 16, the acts further comprising:
   performing the merge on the incremental index by moving previously-identified updated documents and previously-identified new documents from the changed document index to the unchanged document index.

19. The one or more physical storage media storing computer-executable instructions of claim 16, the acts further comprising:
   including at least one cached document result entry in the updated query result, the at least one cached document result entry identifying an individual unchanged document.

20. The one or more physical storage media storing computer-executable instructions of claim 19, wherein the at least one cached document result entry does not identify any documents that have changed since the merge.

* * * * *